UNITED STATES PATENT OFFICE.

CYRUS E. BRADLEY, OF WILMINGTON, DELAWARE.

IMPROVEMENT IN COMPOUNDS FOR FILLING WOOD.

Specification forming part of Letters Patent No. 144,948, dated November 25, 1873; application filed October 10, 1873.

*To all whom it may concern:*

Be it known that I, CYRUS EMERSON BRADLEY, of Wilmington, in the county of New Castle and State of Delaware, have invented a new and Improved Compound for Filling; and I do hereby declare the following to be a full, clear, and exact description thereof, which will enable those skilled in the art to make and use the same.

This invention relates to a compound which is designed exclusively for closing the pores, crevices, and abrasions that exist on woody surfaces, and which prevent the immediate application of varnish or of any polishing compound. To this end, my invention consists in combining, with a solution of "para" or india-rubber, shellac, litharge, and sugar of lead, which are treated and compounded as hereinafter specified, whereby is produced a filling for the pores of wood-work prior to the application of varnish.

In preparing my compound, I take india-rubber, and dissolve the same in raw oil, naphtha, benzine, spirits of turpentine, bisulphide of carbon, or any of its solvents. For instance, one-half pound of india-rubber can be dissolved in one and one-half gallon of raw oil, using heat to accomplish the solution. While this solution is forming, I prepare another in a separate vessel, (using, also, heat to accomplish the result,) taking, say, one and a half pound of shellac, one gallon of oil, one and a half pound of litharge, and fifteen ounces of sugar of lead. After these ingredients have been heated together and well mixed, I set the solution aside to cool, and while cooling I thin the same with half a gallon of spirits of turpentine. When both solutions are ready, I stir them together in one vessel, and the compound is ready for use.

In applying my compound, I coat the surface to be covered in the same manner in which varnish is usually applied. Then I let the coat stand for about thirty minutes, and rub it over with a clean rag. After the article has stood for a day it will be ready for its coat of varnish or polish.

By the use of my filling compound the great advantage is gained that one coat of varnish is sufficient where, without the filling compound, from five to seven coats of varnish are required in order to produce the desired finish.

My filling compound is limited in its application to cabinet-work, furniture, piano-fortes, billiard-tables, and the interior of railroad-cars.

What I claim as new, and desire to secure by Letters Patent, is—

A compound for filling the pores of wood-work prior to the application of varnish, consisting of a solution of para or india-rubber, shellac, litharge, and sugar of lead, compounded in the manner and about in the proportions substantially as set forth.

CYRUS EMERSON BRADLEY.

Witnesses:
 CHAS. S. ROBB,
 WM. S. AUCHINCLOSS.